United States Patent [19]

Moore et al.

[11] Patent Number: 4,656,382
[45] Date of Patent: Apr. 7, 1987

[54] END WINDING BRACING SYSTEM FOR GAS-COOLED ROTORS OF LARGE GENERATORS

[75] Inventors: William G. Moore, Winter Springs; Warren W. Jones, Geneva; John C. Larue, Orlando, all of Fla.

[73] Assignee: Westinghouse Electric Corp., Pittsburgh, Pa.

[21] Appl. No.: 802,561

[22] Filed: Nov. 27, 1985

[51] Int. Cl.$^4$ ............................................... H02K 3/46
[52] U.S. Cl. ........................................ 310/270; 310/58
[58] Field of Search .................... 310/52, 55, 56, 57, 310/58, 59, 60 R, 60 A, 64, 65, 91, 208, 260, 270, 254, 61; 336/197

[56] References Cited

U.S. PATENT DOCUMENTS

| | | | |
|---|---|---|---|
| 2,844,746 | 7/1958 | Coggeshall | 310/270 |
| 3,005,119 | 10/1961 | Schmitt | 310/64 |
| 3,098,941 | 7/1963 | Willyoung | 310/61 |
| 3,842,303 | 10/1974 | Simmonds | 310/270 |
| 4,543,503 | 9/1985 | Kaminski | 310/270 |

FOREIGN PATENT DOCUMENTS

| | | | |
|---|---|---|---|
| 0722293 | 11/1965 | Canada | 310/61 |
| 0619841 | 11/1968 | Italy . | |
| 0102503 | 8/1979 | Japan | 310/61 |

*Primary Examiner*—R. Skudy
*Attorney, Agent, or Firm*—G. H. Telfer

[57] ABSTRACT

In a machine such as a turbine generator with a rotor whose end turns are covered by a continuous retaining ring, axial blocks and support blocks are used in an end turn bracing system with the axial block supported by the support blocks at intermediate locations and with openings through the axial blocks at those locations that have a greater axial extent than the support blocks and permit axial gas flow that avoids obstruction by the support blocks. The support blocks are provided of laminated material whose laminations run continuously throughout both major and minor legs of their L-shaped cross-sectional configuration to avoid delamination due to stresses encountered in operation.

4 Claims, 7 Drawing Figures

END WINDING BRACING SYSTEM FOR GAS-COOLED ROTORS OF LARGE GENERATORS

BACKGROUND OF THE INVENTION

This invention relates to dynamoelectric machines and particularly to systems for bracing the end turns of rotors of large generators that are cooled by a gas.

While the invention may be used on newly manufactured machines, it is also well suited for retrofitting into existing machines. Large numbers of turbine generators in service today have enjoyed a long service life which is being further lengthened by modernization programs that replace selected components with new and improved ones. Older rotors can be substantially refurbished by completely removing the rotor winding from the existing core and replacing it with a new winding having new copper conductors and new insulation as well as a new end winding bracing system. Normally, end windings extend axially straight out of the rotor core and then curved in substantially arcuate portions that interconnect with other axially straight portions. To minimize wear due to thermal and rotational effects, the end winding is secured by a bracing system for uniting the respective end turns together using blocks of rigid insulating material.

The overall end turn system at each end of the rotor is covered by a solid metal retaining ring. In original manufacture of many of the generators in present service the retaining rings had radial holes for coolant gas circulation through the end turn region. However, when some machines of that type have been modernized, it has been decided to have solid retaining rings without apertures for greater mechanical security. To provide gas flow through the end turn region, a blocking system is used that allows axial flow of the coolant between adjacent end turns in the axially straight portions of the end turns. Some machines were modernized with a blocking system in which an axial block disposed generally parallel to adjacent end turn straight portions is supported between two ventilation blocks at its extremities. In order that the ventilation blocks do not prevent axial gas flow they were provided with axial apertures that communicated with an end opening of the axial block which was available for coolant gas flow. It was found after some period of service that this arrangement of blocking was subject to possible deterioration and a lack of blocking capability over an undesirably short time. The ventilation blocks, as well as the axial blocks, are molded of a resin reinforced glass fiber laminate material. Such materials have good qualities of strength and electrical insulation. However, the notches in which the axial blocks fit within the ventilation blocks promoted delamination of the ventilation blocks as a result of the normal kinds of forces that the blocking system is subjected to during operation.

By way of further background, FIG. 1 shows a generalized and simplified view of a turbine generator of a prior art type to which the present invention pertains. The machine is an AC synchronous generator with a stator core 10 and stator winding 12 illustrated for general reference. A rotor core 14 is located on a shaft 16 within the stator and has conductive coils 18 within axially running slots. The coils extend out from the core 14 at both ends of the machine forming coil end turns that include axially straight portions 18a and arcuate portions 18b interconnecting straight portions in accordance with known practice. The end turns 18a and 18b at each end of the machine are held against centrifugal forces by a retaining ring 20.

A coolant gas such as hydrogen flows axially into the end turn region along the shaft 16. In early machines the retaining ring 20 had radial apertures through which the gas flowed out from the end turns. More recently machines have been equipped with solid (i.e., unapertured) retaining rings so they are less susceptible to cracking. Consequently the gas path through the end turns is axial through the end turns and the gas exits the rotor from vent scoops after making a complete axial passage through the end turns.

The regions 19 between the axially straight end turn portions 18a are to be provided with support blocks to maintain the end turns as a secure unit. Prior art forms of such blocks will now be discussed in conjunction with FIGS. 2 and 3.

FIG. 2 shows a support block structure 22 for fitting in the regions 19 of FIG. 1. In a given region 19, a structure 22 may be used one, two, or three times depending on the axial length of the region. Block structure 22 includes an axial block 24 and a ventilation block 26 at each end of the axial block. The ventilation blocks 26 fit tightly between adjacent end turn portions 18a and have axial vent passages 26a for cooling gas. Axial block 24 has end portions 24a fitting tightly in notches 26b in the ventilation blocks 26. The axial block 24 also has intermediate end portions 24b that include a gap or recess for permitting axial gas flow (arrows) through one ventilation block and over lateral surfaces of the axial block 24 to and through the other ventilation block. The vent blocks 26 secure the coils together while the axial blocks secure the vent blocks in place. Additionally, the axial blocks take up about half the space between coils (typically they are about 0.5 in. thick for about a 1 in. coil space) and thus confine the gas flow to narrower passages so the gas flows more rapidly and heat transfer is improved.

FIG. 3 shows an overhead view of a ventilation block 26 and an axial block 24 in accordance with FIG. 2. The lines show the direction in which laminations 26c run in the ventilation block 26. Tangential movement of the axial block 24, caused by relative movement between coils from differential thermal expansion and rotation loading, causes the axial block 24 to move to the position shown in dashed lines and to pry apart the ventilation block 26 as shown. The delamination starts from the corner of the keyway cut or notch 26b in which the axial block 24 fits into the ventilation block 26. The corner is a natural crack initiator and the parallel laminations of the block allow a crack to propagate quite easily.

In another form of prior art blocking, substantially the same configuration as that of FIG. 2 is used but the laminations of the ventilation block 26 run transversely rather than axially. Delamination can still occur, however, because of cracks initiated in the corners of the notches 26b.

In accordance with the present invention, the foregoing difficulties are overcome while still retaining the ability to use components of laminated material. As before, axial blocks are located between adjacent pairs of axially straight end turn portions but now they are supported differently and provide axial gas flow paths in a different manner. In contrast to the former construction, the support blocks are now located intermediate the ends of the axial block. A single axial block may extend fully between the core and the point at which the straight portion turns into an arcuate portion. At one or more locations along the length of each of the axial blocks there is a pair of support blocks. The support blocks engage the lateral sides of the axial blocks and the adjacent end turn and also engage the radial inside of the axial block. That is, each support block has a generally L-shaped cross section with a major leg disposed between one of the lateral surfaces of an axial block and one of the adjacent pairs of axially straight end turn portions. Each support block also has a minor leg disposed radially inside the axial block, preferably in a notch therein. The support block is of molded resin-impregnated glass fiber laminated material so formed that the laminations run continuously through both the major and minor legs for avoiding any tendency for delamination at the point where the major and minor legs connect.

To allow axial gas flow, the axial blocks have vent openings transversely from side to side at each location of a pair of support blocks. These vent openings have an axial extent greater than that of the support blocks so that the coolant gas can flow axially and not be blocked by the support blocks. Also, preferably, the axial blocks have chamfered portions axially fore and aft of each of the vent openings for streamlining coolant gas flow into and out of the vent openings.

The invention avoids the delamination problem found to occur in the prior axial blocking arrangements and yet still permits easy retrofitting into existing machines, as well as being useful in new manufacture.

DESCRIPTION OF THE PREFERRED EMBODIMENTS

Figure 1:
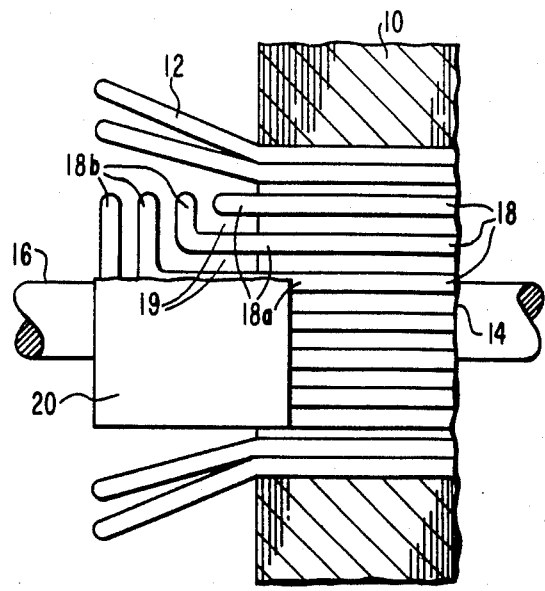
FIG. 1 is a partial side elevation view of a dynamoelectric machine, in accordance with the prior art, in which a need for axial blocking in the rotor and turns exists.
Figure 2:
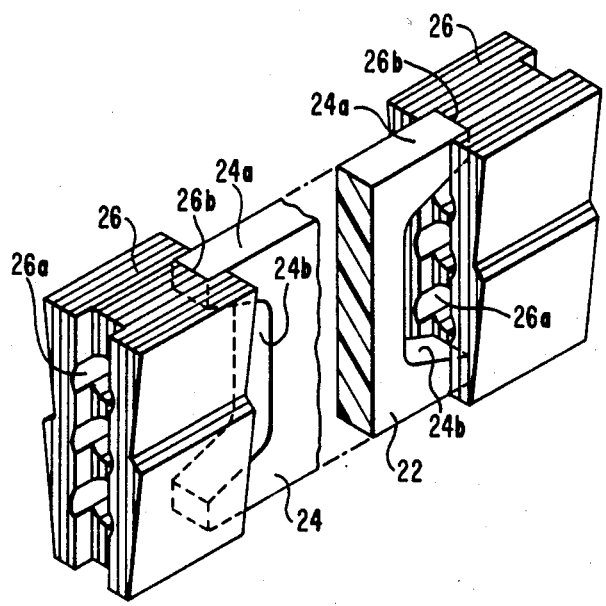
FIGS. 2 and 3 are respectively perspective and top plan views of a prior art blocking arrangement.
Figure 3:
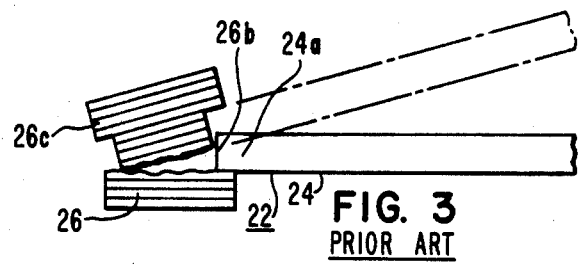

FIGS. 1, 2 and 3 relate to the prior art and have been previously described. The following description may be best understood in connection with the overall view of FIG. 1.

Figure 4:
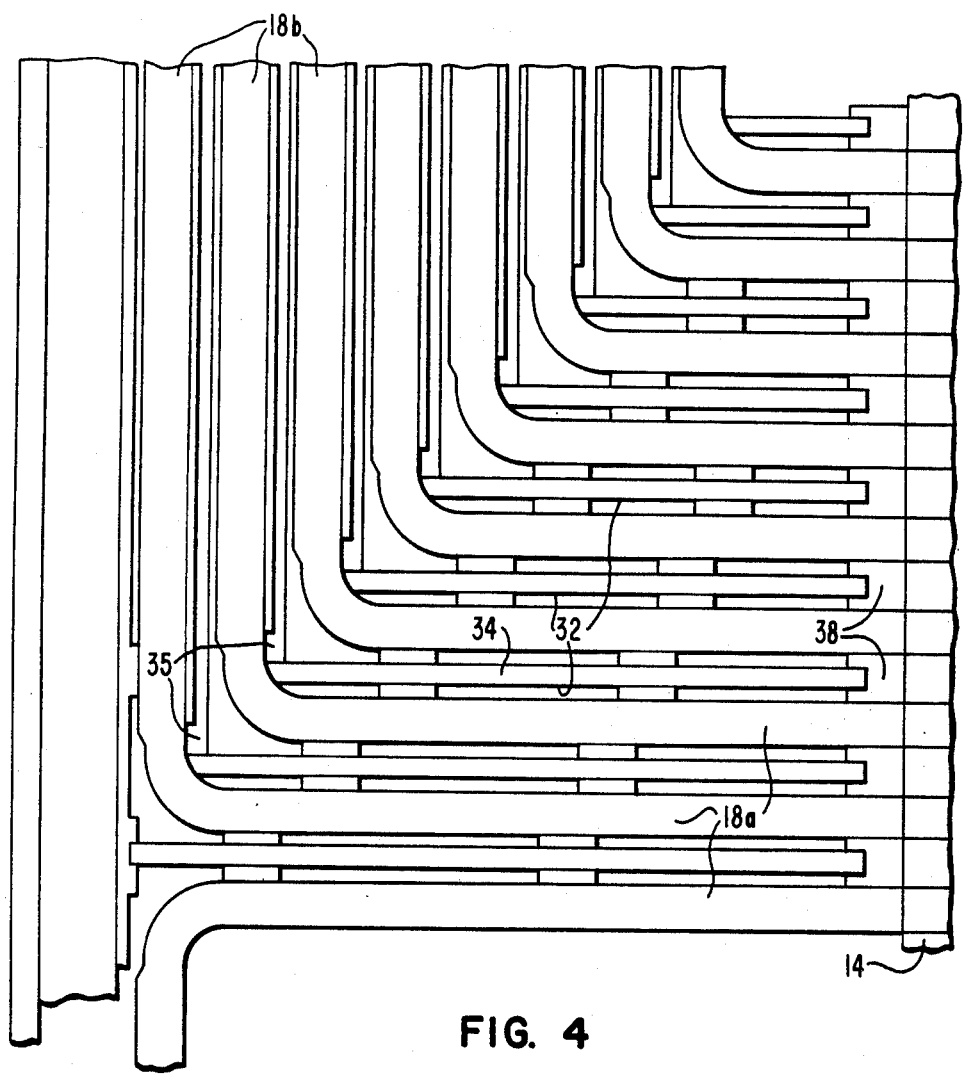
FIG. 4 is a partial view of a dynamoelectric machine rotor end turn region incorporating the present invention.
Figure 5:
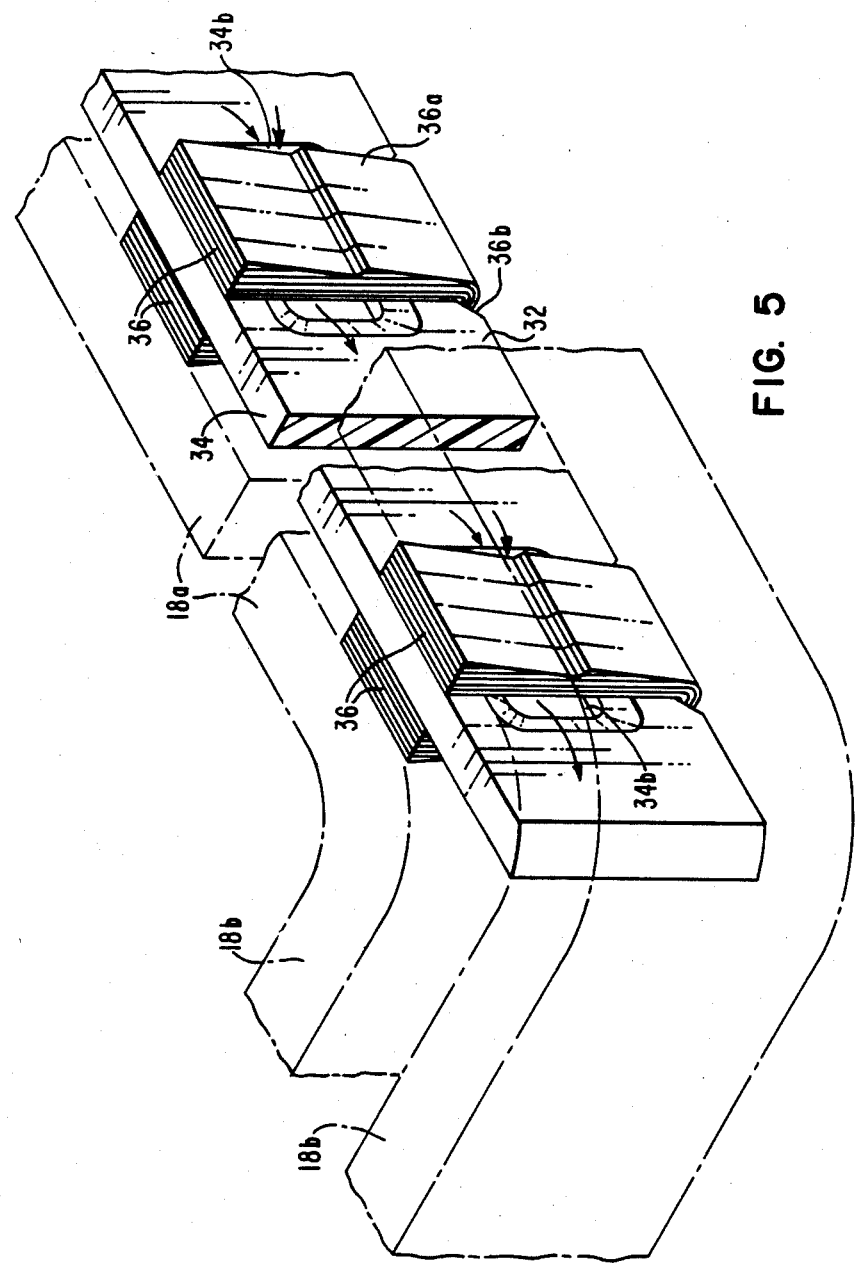
FIG. 5 shows a perspective view of an end turn bracing system employing blocking in accordance with the present invention.
Figure 6:
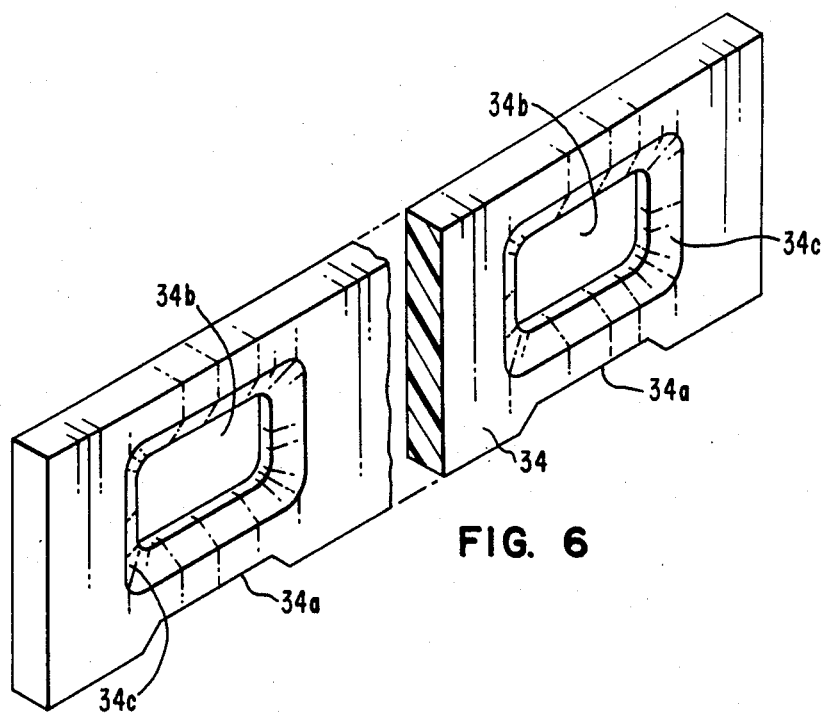
FIG. 6 shows a perspective view of an axial block in accordance with an embodiment of the present invention.
Figure 7:
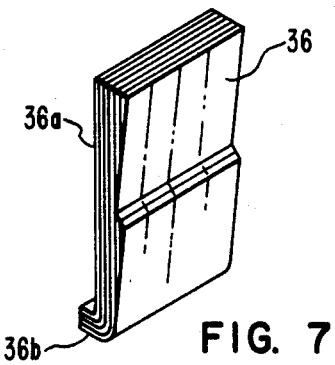
FIG. 7 shows a perspective view of a support block in accordance with an embodiment of the present invention.

FIG. 4 shows part of the rotor end turn region in a laid out or developed form. In this view the rotor core 14, the axially straight end turn portions 18a and the arcuate end turn portions 18b can be seen. Between adjacent ones of the axially straight portions 18a are components of the improved axial bracing system 32 in accordance with this invention. While the improved bracing system components are utilized in a plurality of locations, they are not necessarily used between each pair of adjacent straight end turn portions 18a, particularly where such portions are relatively short. The components of the bracing system and their salient features can be best seen in FIGS. 5, 6 and 7 wherein FIG. 5 shows the assembled combination of bracing components in relation to the rotor coil portions. FIGS. 6 and 7 respectively show an individual axial block and an individual support block as used in that combination.

Referring to FIGS. 4 and 5, an axial block 34 is located between an adjacent pair of axially straight end turn portions 18a in substantially parallel relation with them. In overall configuration, in this example, the axial block 34 has a generally rectangular shape with major surfaces parellel to the adjacent coils. One end of an axial block 34 may abut directly against the arcuate portion 18b of the turn whose straight side is on one side of the axial block and is outside the arcuate portion of the other end turn to which the axial block is adjacent. A circumferential block 35 runs alongside arcuate coil portions 18b and abuts against the end of the axial block 34 that abuts against arcuate end turn 18b. The other extremity of the axial block 34 may and preferably does extend entirely to an end support block 38 that abuts against a tooth of the rotor core to maximize the bracing effect.

The axial block 34 is associated with pairs of support blocks 36. Two pairs of support blocks 36 are shown in FIG. 5. One or more pairs of support blocks may be used with individual axial blocks 34 depending on the length of the axial block and hence the degree of lateral support desired.

The support blocks 36, each pair of which supports the axial blocks in relation to the adjacent pairs of axially straight end turn portions 18a, each have a generally L-shaped cross-section (FIG. 7). A major leg 36a is disposed between one of the lateral surfaces of the axial block 34 and one of the adjacent pairs of straight end turn portions 18a. Each support block 36 also has a minor leg 36b disposed radially inside the axial block 34, preferably in a notch 34a provided therein.

The axial block 34 has vent openings 34b at the location of each of the pairs of support blocks 36. The vent openings 34b are for the purpose of permitting a generally axial gas flow that circumvents the blockage that the support blocks 36 would otherwise impose. The vent openings 34b extend transversely through the axial block 34 and are of a greater axial extent than the support blocks 36 so that the coolant gas can flow alongside the major surface of the axial block into an opening and through the region bounded by the pair of support blocks and then out of the opening for further travel along one of the major surfaces of the axial block (see FIG. 5 arrows). Naturally, there is some division of the gas flow along the two sides of the axial block 34 where it exits the opening 34b. To streamline the coolant gas flow into and out of the vent opening 34b it is preferred that the axial blocks 34 have chamfered portions 34c axially fore and aft of each of the vent openings.

The support blocks 36, as well as the axial blocks 34, may be made of resin-impregnated glass fiber laminated material for high strength and durability. In accordance with this invention, the support blocks 36 are formed, by molding, so that the laminations run continuously through both the major and minor legs so as to avoid delamination where the legs connect. FIG. 7 shows lamination lines 36c that run continuously through both the major and minor legs 36a and 36b.

In assembly, the support blocks 36 are put in place between coils and then the axial block 34 is forced between them. Adhesive bonding between the elements is not necessarily used but may be used if desired. It is advantageous that the blocking system of the invention can be inserted from the radial outside of the coils (from the top in FIG. 5) in contrast to the former system of FIG. 2 that required insertion from the inside because of the step that occurs in the profile of the coil portions 18a. The fact that two support blocks 36 are used instead of a single block 26 greatly alleviates installation of the blocking system.

It is, therefore, seen that by providing support blocks intermediate the ends of axial blocks with openings as shown for permitting the axial gas flow and by arranging the support blocks in a manner so that the laminations run continuously through them, the above-described problems of the prior art are avoided.

What is claimed is:

1. A dynamoelectric machine comprising:
    a stator having a stator core and a stator winding;
    a rotor core on a shaft mounted for rotation within said stator, a rotor winding on said rotor core with a plurality of end turns extending beyond each axial extremity of said rotor core, portions of said end turns extending substantially axially and parallel to each other;
    a substantially cylindrical retaining ring disposed over said end turns;
    an end winding bracing system for supporting said end turns and for allowing axial ventilation between said axial and parallel portions of said end turns, said bracing system comprising an axial block between and parallel to an adjacent pair of said end turn portions, said axial block having an opening substantially orthogonal to the axial direction, and a pair of support blocks, arranged on opposite sides of said opening of said axial block and supporting said axial block in relation to said adjacent pair of said end turn portions, said pair of support blocks being substantially centrally located in relation to said opening and partially covering said opening while allowing axial flow of a gas coolant in a flow path over lateral surfaces of said axial block, into said opening under said support blocks, and out of said opening after the axial termination of said support blocks.

2. A dynamoelectric machine in accordance with claim 1 wherein:
    said support blocks each have a generally L-shaped cross-section with a major leg disposed between one of said lateral surfaces of said axial block and one of said end turn portions and with a minor leg disposed radially inside said axial block, said support blocks being of resin-impregnated glass fiber laminated material with laminations running continuously through both said major and minor legs.

3. A dynamoelectric machine in accordance with claim 2 wherein:
    said minor leg of each of said support blocks is fit within a notch on a radially inside edge of said axial block, and,
    said axial block has chamfered portions of axially fore and aft of said opening for smoothing gas flow into and out of said opening.

4. In an end winding bracing system for a gas cooled rotor of a dynamoelectric machine having a plurality of end turns with axially straight and parallel portions extending from a rotor core and substantially arcuate and parallel portions joining the axially straight portions, the combination comprising:
    a plurality of axial blocks respectively located between adjacent pairs of axially straight end turn portions;
    a plurality of pairs of support blocks, respectively intermediate the ends of one of said axial blocks, that support said axial blocks in relation to the adjacent pairs of axially straight end turn portions, each support block having a generally L-shaped cross-section with a major leg disposed between one of said lateral surfaces of one of said axial blocks and one of said adjacent pairs of axially straight end turn portions and a minor leg disposed radially inside said one of said axial blocks in a notch therein, said support blocks being of resin-impregnated glass fiber laminated material with laminations running continuously through both said major and minor legs for avoiding delamination where said major and minor legs connect;
    said axial blocks having vent openings at the location of each of said pairs of support blocks, said vent openings each having an axial extent greater than that of said support blocks for permitting coolant gas flow axially around said support blocks, said axial blocks also having chamfered portions axially fore and aft of each of said vent openings for smoothing coolant gas flow into and out of said vent openings.

* * * * *